M. Raezer.
Horse Rake.
No. 3,255. Reissued Jan. 5, 1869.

Inventor.
M. Raezer.

N. PETERS, PHOTO-LITHOGRAPHER, WASHINGTON, D. C.

UNITED STATES PATENT OFFICE.

ADAM R. REESE, OF PHILLIPSBURG, NEW JERSEY, ASSIGNEE, BY MESNE ASSIGNMENTS, OF MATHIAS RAEZER.

IMPROVEMENT IN HORSE-RAKES.

Specification forming part of Letters Patent No. 21,698, dated October 5, 1858; Reissue No. 3,255, dated January 5, 1869.

*To all whom it may concern:*

Be it known that MATHIAS RAEZER, of Reading, county of Berks, and State of Pennsylvania, did invent certain new and useful Improvements in Horse-Rakes, of which the following is a full, clear, and exact description, reference being had to the accompanying drawing, in which—

Figure 1:
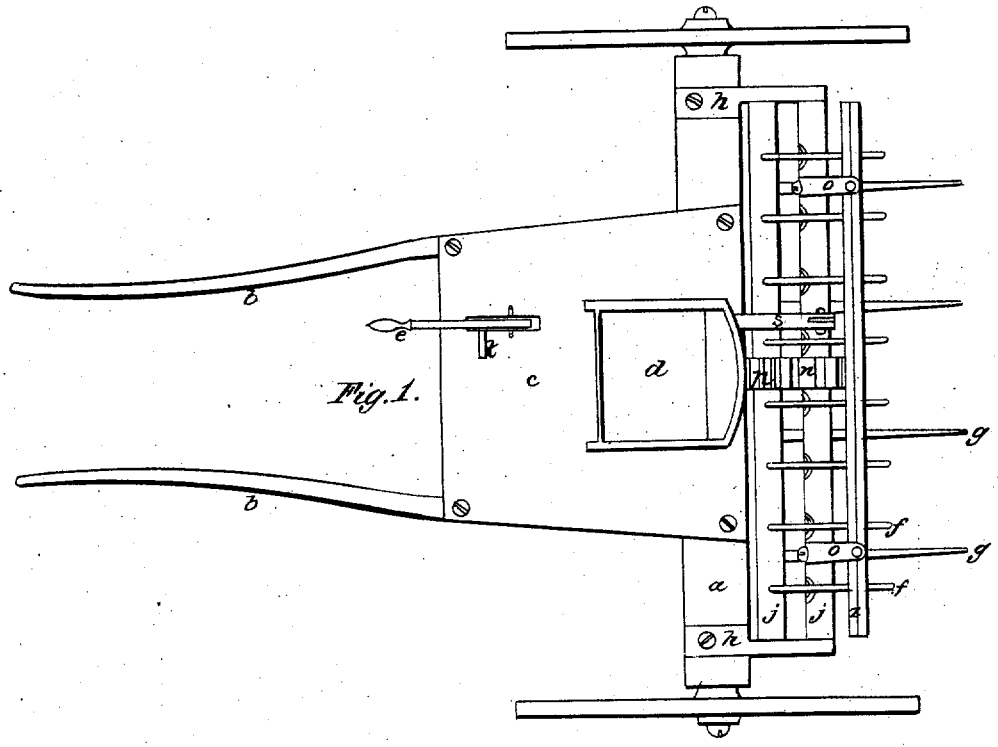
Figure 2:
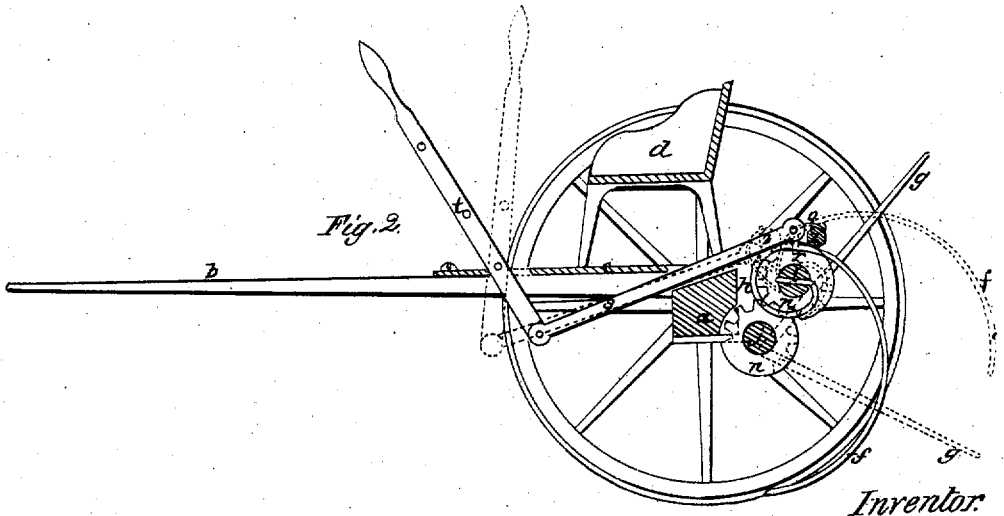

Figure 1 is a plan or top view, and Fig. 2 is an end section view, showing in dotted lines the position of the rake-teeth, the cleaner-rods, and the operating mechanism when the gathered load is being discharged.

The invention consists in an improved construction of hay-rakes and arrangements of its parts, whereby the teeth of said rake are put more completely under the control of the driver and the teeth are more easily and effectually disengaged from the hay or grain while in operation; but the nature of this invention will be better understood from the following description of its construction and operation.

*a* is the axle, to which are secured the thills *b b*, upon which is placed the platform *c*. *d* is the driver's seat, and *i* and *j* the rollers or shafts, mounted in bearings upon the supports *h h*. These rollers or shafts are placed in a line parallel to the axle, between the wheels, and within their peripheries, thus making a snug, compact machine, and lessening their liability to damage in either shipping or using. *n n* are toothed segments attached to the ends of the said rollers, by means of which their rotation is made simultaneous and in opposite directions when operated by means of the lever *e*, pivoted in the platform, the connecting-rod *s*, and the arm *r* projecting from the upper side of the rollers *i*. The spring-teeth *f* pass entirely around the shaft *r* in a serpentine form, then pass through, and are riveted or fastened by screws. *g g* are cleaner-rods attached to and operated by the shaft *j*. *z* is a bar, connected to the roller *i* by means of the springs *o o*, and bearing upon the teeth. *t* is a pin, projecting from the lever *e* in such position that the driver can conveniently put his foot on it while riding in the seat.

The operation of the rake is as follows: The driver places his foot upon the pin *t* in the lever *e*, throwing it forward, and thereby holding the teeth firmly upon the ground by means of the connecting-rod *s*, arm *r*, roller *i*, and bar *z*. The teeth are held firmly down until they shall have gathered a sufficient load, when the driver, taking his foot off the pin, pulls the lever toward him. This rotates the shaft *i*, elevating the teeth, and disengaging them from the accumulated hay or grain, while at the same time, by means of the toothed segments *n n*, the roller *j* is rotated in an opposite direction, throwing the cleaners down, making the delivery of the load from the teeth certain and complete.

It will be obvious, from this description, that among the advantages derived from this construction are these, that the driver can readily adjust the downward pressure upon the teeth to suit the requirements of the work, and can discharge his load from the teeth much more easily by pulling the lever toward him, than can be done by thrusting said lever from him, as is done in the machines in common use.

Having now described the invention of the said MATHIAS RAEZER, what is claimed, and sought to be secured by Letters Patent, is—

1. The vibrating cleaner-rods to a two-wheel wire-tooth hay-rake, in combination with a hand-lever for vibrating the same, operated by the attendant while riding on the seat.

2. In combination with a two-wheel wire-tooth hay-rake, a hand-lever, operated by the attendant while riding on the seat, for simultaneously raising the teeth and operating the vibrating cleaner-rods.

3. In combination with a two-wheel wire-tooth hay-rake the teeth of which are supported against backward strain at a point betwixt and within the periphery of the wheels, a hand-lever, operated by the attendant while riding on the seat, for raising the teeth and operating the vibrating cleaner-rods.

4. A foot-support on the lever, for the purpose of supporting the foot of the attendant while he presses the lever from him while riding on the seat, for the purpose of holding the teeth to the ground while in operation.

5. In combination with a two-wheel wire tooth hay-rake, with the teeth supported against backward strain at a point betwixt and within the periphery of the wheels, a hand-lever, and a connecting rod or link uniting said lever with the rake-head in such manner that the operator, while riding on the seat, can raise the teeth by drawing the upper end of said lever backward, and can depress the same by pressing the lever forward.

6. In combination with a two-wheel wire-tooth hay-rake, with the teeth supported against backward strain at a point betwixt and within the periphery of the wheels, a lever, and a connecting rod or link uniting said lever with the rake-head, and operated by the attendant while riding on the seat, for lowering the teeth, by pressing the top of the lever forward and drawing it backward for raising the teeth, with a device for cleaning the teeth of the gathered hay in their upward motion.

ADAM R. REESE.

Witnesses:
H. H. DOUBLEDAY,
ALEX. MAHON.